(12) United States Patent
Riedinger et al.

(10) Patent No.: US 8,042,889 B2
(45) Date of Patent: Oct. 25, 2011

(54) MULTIPLE DRIVE FOR TRACKED RUNNING GEAR

(75) Inventors: Harald Riedinger, Zweibruecken (DE); Ingo Nöske, Zweibruecken (DE); Werner Rutz, Queidersbach (DE)

(73) Assignee: Terex Demag GmbH, Zweibruecken (DE)

( * ) Notice: Subject to any disclaimer, the term of this patent is extended or adjusted under 35 U.S.C. 154(b) by 38 days.

(21) Appl. No.: 11/921,591

(22) PCT Filed: Mar. 13, 2007

(86) PCT No.: PCT/DE2007/000484
§ 371 (c)(1),
(2), (4) Date: Dec. 5, 2007

(87) PCT Pub. No.: WO2007/112721
PCT Pub. Date: Oct. 11, 2007

(65) Prior Publication Data
US 2009/0033147 A1 Feb. 5, 2009

(30) Foreign Application Priority Data
Apr. 5, 2006 (DE) .................. 10 2006 016 728

(51) Int. Cl.
*B62D 55/14* (2006.01)
(52) U.S. Cl. .................. 305/126; 305/135; 305/139
(58) Field of Classification Search .................. 305/120, 305/20, 124–127, 135, 143, 60, 139
See application file for complete search history.

(56) References Cited

U.S. PATENT DOCUMENTS

| | | | | |
|---|---|---|---|---|
| 1,079,164 A | * | 11/1913 | Chenette | 180/9.62 |
| 1,112,460 A | * | 10/1914 | Leavitt | 180/9.5 |
| 3,710,886 A | * | 1/1973 | Wagner | 180/9.21 |
| 3,872,939 A | | 3/1975 | Eckert | |
| 3,960,229 A | * | 6/1976 | Shio | 180/9.62 |
| 4,068,732 A | * | 1/1978 | Granryd | 180/6.7 |
| 4,519,465 A | * | 5/1985 | Triplett | 180/6.48 |
| 5,839,802 A | * | 11/1998 | Sheets | 305/52 |
| 6,076,619 A | * | 6/2000 | Hammer | 180/6.48 |
| 6,659,573 B1 | | 12/2003 | Knecht et al. | |

(Continued)

FOREIGN PATENT DOCUMENTS

GB 191105857 1/1911

OTHER PUBLICATIONS

Search Report dated Jul. 12, 2007 for the underlying International Application No. PCT/DE2007/000484.

*Primary Examiner* — Jason Bellinger
(74) *Attorney, Agent, or Firm* — Browdy and Neimark, PLLC

(57) ABSTRACT

The invention relates to a tracked running gear, in which two running gears are arranged parallel to one another and each running gear has a longitudinal member (1) and a running gear chain (2) which runs around the longitudinal member in the longitudinal direction thereof and forms an upper and a lower strand, and at least one traction drive, composed of a motor, transmission and a drive gearwheel which meshes into the running gear chain and also a deflecting wheel which permits chain tensioning by means of a movement relative to the fixed part of the longitudinal member, characterized in that at least one additional traction drive (3) which acts on the upper strand is provided on the longitudinal member, wherein the running gear length is changed or remains unchanged.

25 Claims, 3 Drawing Sheets

U.S. PATENT DOCUMENTS

| | | | |
|---|---|---|---|
| 6,742,612 B2 * | 6/2004 | Campbell et al. | 180/6.48 |
| 2002/0104693 A1 | 8/2002 | Moore et al. | |
| 2003/0121705 A1 * | 7/2003 | Rau | 180/9.1 |
| 2003/0226697 A1 * | 12/2003 | Haringer | 180/9.1 |
| 2008/0012422 A1 * | 1/2008 | Streitz | 305/122 |
| 2009/0200091 A1 * | 8/2009 | Porubcansky et al. | 180/9.5 |

* cited by examiner

MULTIPLE DRIVE FOR TRACKED RUNNING GEAR

CROSS-REFERENCE TO RELATED APPLICATIONS

This is a U.S. national stage of International Application No. PCT/DE2007/000484, filed on 13 Mar. 2007. Priority is claimed on German Application No. 10 2006 016 728.7, filed on 5 Apr. 2006.

BACKGROUND OF THE INVENTION

1. Field of the Invention

The invention pertains to a crawler, in which at least two crawler assemblies are arranged parallel to each other, and in which each crawler assembly has a longitudinal beam; a caterpillar track, which travels around the longitudinal beam in the longitudinal direction of the beam and which has an upper run and a lower run; at least one drive mechanism consisting of a motor, a gearbox, and a drive sprocket, which meshes with the caterpillar track; and an idler wheel, the position of which can be shifted relative to the stationary part of the longitudinal beam to tighten the track.

In the development of mobile cranes with very large capacities, it is necessary to take into consideration not only the changes in the load-bearing parts of the crane but also those in the parts which provide mobility, namely, the crawlers.

2. Description of the Related Art

For mobile cranes of this class, which have a high intrinsic weight and which also must be able to move under maximum load, it is essential that suitable and powerful drives be installed in the crawler assemblies, namely, drives which can provide the necessary forward drive forces (drive power). Drives suitable for these larger cranes are available on the market but not in all sizes. It is therefore not possible to purchase an appropriately sized drive to fulfill all of the possible requirements.

SUMMARY OF THE INVENTION

The task of the invention is therefore to provide a crawler which can be adapted to different power requirements according to the modular principle.

According to the invention, at least one additional drive is mounted on the longitudinal beam to act on the upper run, where the length of the crawler assembly remains essentially unchanged.

The additional drive is preferably mounted detachably on the longitudinal beam located at one end of the longitudinal beam.

In the case of mobile cranes which have an undercarriage consisting of wheels and axles, it is possible to change, i.e., to increase, the number of driven wheels or axles.

This can lead to transport problems, however, because, as a result of the increase in the number of driven wheels or axles, the axle load which must be observed for highway transport can be increased beyond the legal limit. In principle, however, adaptation is possible in this way.

The situation is different with tracklaying crawlers. Because of the way in which they are designed, the relationships, the situations, are different. But even here, for example, the weight will increase when multiple drive units are used, because it is also necessary state-of-the-art to increase the number of track links used. The reason for this is that the drive track must be guided reach over all of the drives, and since these occupy more space, the track must be longer.

According to the invention, additional drives are used which are mounted permanently on the longitudinal beam or mounted on it only when needed. Thus, through careful installation of several drives in series, the drive power can be significantly increased even with standard commercial drives. A very essential aspect is that this multiple drive is installed at one end of the crawler, usually at the end facing away from the forward travel direction, to take into account the function of track-tightening. By shifting the idler wheel, the track can be brought into a defined state of tension. Now if the drive were to be divided between the front and back of the crawler, i.e., one at each end of the crawler or at each end of the longitudinal beam, it would be possible to tighten the track only by shifting one of the drive units relative to the other one on the longitudinal beam. This represents a considerable design challenge, because the forces which occur as a result of the extreme operating loads must be transmitted by the complete shifting mechanism into the structure of the crawler. A drive arrangement having 2 drives per crawler has previously been realized in the case of so-called "Terex-Quadro" drive, where the 2 drives are not shiftable with respect to one another.

To change the tension of the track, an idler wheel, as already described above, is generally used, which can be shifted relative to the stationary part of the longitudinal beam by a shifting mechanism.

With the invention of the single-end multiple drive, it is possible to equip heavy vehicles, especially those on crawlers, such as a mobile crane in the present case, with sufficient installed drive power. Through the arrangement of the multiple drive, preferably at one end of the beam, it is also possible, in a simple manner, to bring about the necessary track tension by means of a shiftable idler wheel, which is located at the end of the crawler opposite the drive. Through the aspect of an adaptable multiple drive, the invention acquires considerable advantages as a result of the availability of additionally introducible drive power. Because this is adaptable, it can be installed additionally on demand or, to achieve an advantageous reduction in the transport weight of the crawler, separated from it and transported separately. Through the possibility of installing a multiple drive at one end of a crawler beam, it is also quite conceivable that this drive power-increasing measure could be installed in such a way that, in addition to the one multiple drive, another multiple drive could also be used, namely, on the shiftable end (i.e., on the track-tightening end). This includes in particular the use of the invention in the previously mentioned Terex-Quadro crawlers, in which, in the standard variant, there are already 4 drives installed on the complete crawler, i.e., two on each track side. Through the use of this multiple drive, we thus obtain a crawler concept in which, in sum, 6 or more drives are installed. Thus it is also conceivable in principle, through the repeated use of the multiple drive on one and the same crawler assembly, to implement the variant of the double-ended multiple drive, in which a multiple drive is installed at each end of the crawler assembly, both in the travel direction in front and in the opposite direction. Through the inventive design, the drive power can thus be increased even more, and in principle any desired power level can be achieved.

In summary, the following advantages are therefore obtained an adaptive solution which allows installation of more drive power, either permanently installed or on demand, on an existing crawler assembly of either modular or non modular design. It is possible, through the multiple arrangement of standard commercial gearboxes, to install the necessary driver power without having to resort to large and expensive drive units, to the extent that they are even available on the market in the first place.

Generally, the possibility of guaranteeing adequate drive power for large machines whose intrinsic weight and load must often be moved over unfavorable ground such as that encountered by, for example, lattice-boom crawler cranes.

A wide range of possible uses as a standard or multiple drive, easily realizable through adaptable units.

An expanded range of applications for a crane with modular adaptable crawler units, especially with respect to maneuverability and break-loose behavior on the construction site.

DETAILED DESCRIPTION OF THE PREFERRED EMBODIMENTS

Figure 1:
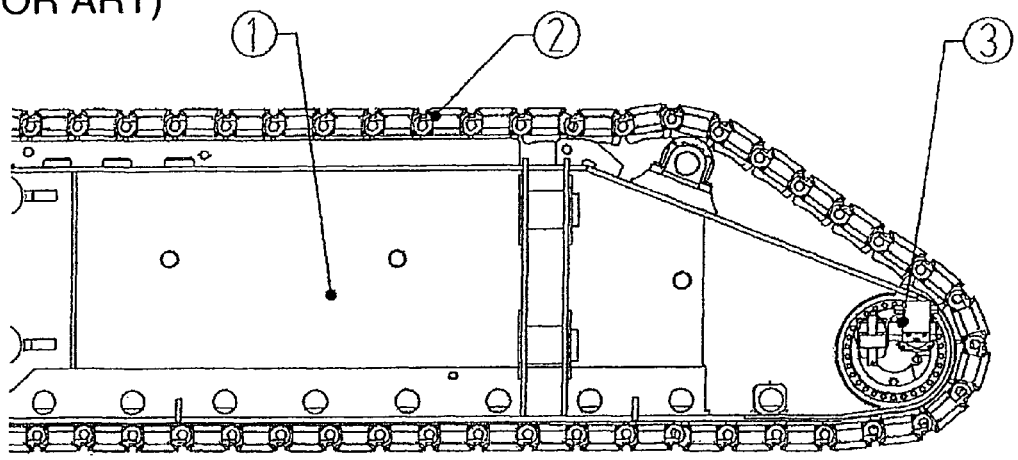
FIG. 1 shows a diagram of a standard drive such as that already in use for some time. The drive is usually located, as illustrated here, at the end of the crawler facing away from the travel direction.
Figure 2:
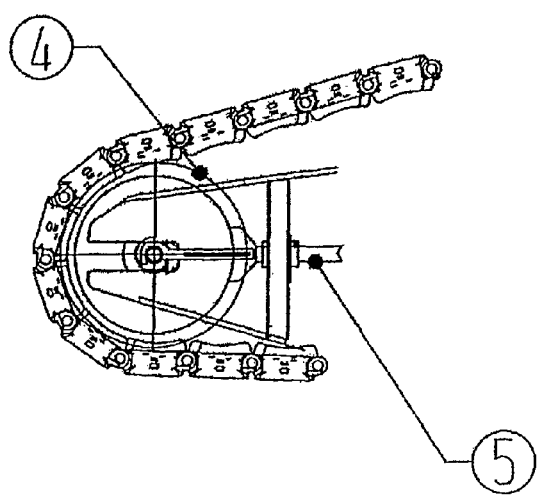
FIG. 2 shows a diagram of the end of the crawler opposite the drive. As shown here, this end is usually located in the front, facing in the travel direction. The simple solution is shown here, according to which a shiftable idler wheel is used to tighten the track easily.

The prior art crawler assembly shown in FIG. 1 includes a longitudinal beam 1 carrying a track 2 having an upper rim and a lower run extending between opposite ends of the beam, the track being driven by a drive unit 3 at one end of the beam. FIG. 2 shows the idler wheel 4 which engages the track at the other end. This idler wheel 4 can be shifted by a track tensioner 5 to adjust the tension of the track.

Figure 3:
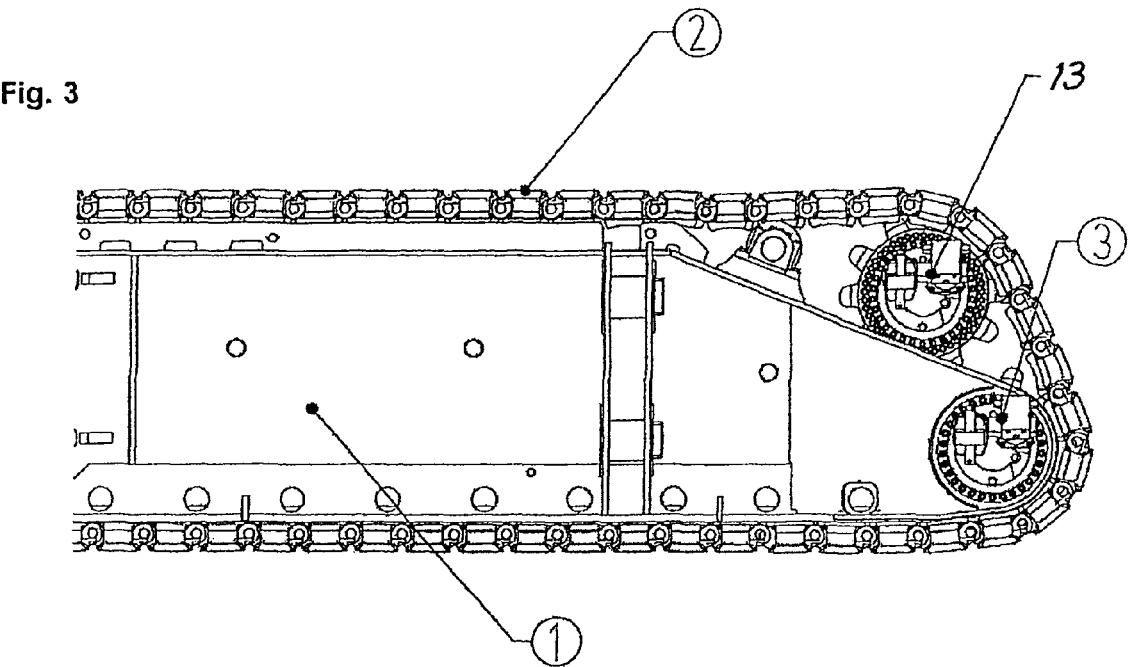
FIG. 3 shows a schematic diagram of an inventive multiple drive assembly, designed here as a double drive assembly and shown as a permanent installation, which provides the crawler with a greatly increased amount of drive power.

FIG. 3 also shows a longitudinal beam 1 carrying a track 2 driven by a drive unit 3 at one end of the beam. According to the invention, an additional drive unit 13 is permanently mounted at this end of the beam.

Figure 4:
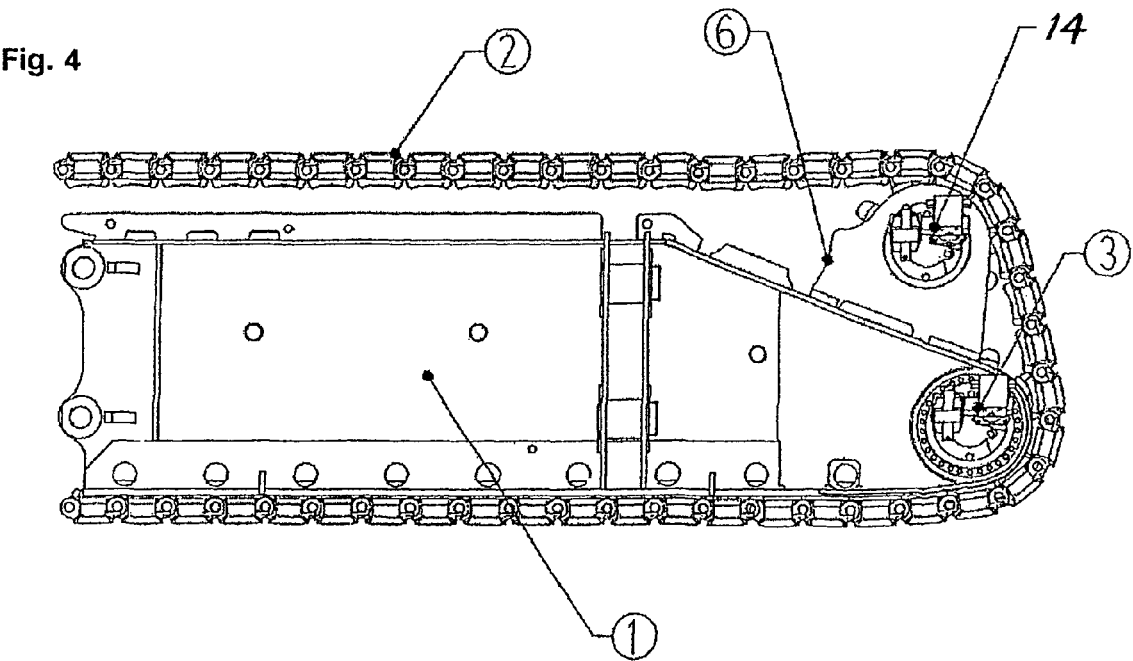
FIG. 4 shows a schematic diagram of another inventive multiple drive assembly, designed here again as a double drive assembly, which shows the flange, which allows an additional drive to be installed adaptably. The schematic diagram shows the adapter flange of this additional drive, which can be installed with screws, bolts, or similar fastening elements on an existing, appropriately prepared crawler.

FIG. 4 shows a variation wherein an additional drive unit 14 is mounted at the one end of the beam by means of a flange 6 which is fixed to the beam by fastening elements which can be removed. The additional drive unit 14 can therefore be installed as needed to provide additional power.

Figure 5:
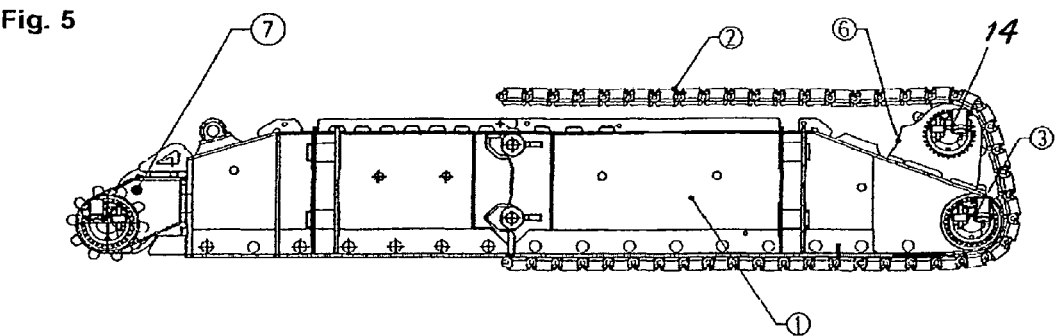
FIG. 5 shows a schematic diagram of the use of an inventive multiple drive on a crane with an existing Terex-Quadro drive, which in this variant has 4 drives (2 per track), and which is provided with additional drive power through the installation of the multiple drive.

FIG. 5 shows a crawler assembly similar to FIG. 4 but having, in addition to the drive unit 3 and the additional drive unit 14 at the one end, a shiftable drive unit 7 replacing the idler wheel at the other end. Taken with the parallel crawler assembly (not shown), this configuration provides a total of six drive units for the crawler.

What is claimed is:

1. A crawler in which two crawler assemblies are arranged parallel to each other, each of the crawler assemblies comprising:
   a longitudinal beam having a longitudinal direction;
   a crawler track, which travels around the beam in said longitudinal direction of the beam and which has an upper run and a lower run;
   at least one drive, comprising a motor, a gearbox, and a drive sprocket, which meshes with the crawler track;
   an idler wheel; and
   at least one additional drive, which acts on the upper run disposed vertically above the longitudinal beam such that an axis of rotation of the additional drive is spaced apart from the longitudinal beam, and
   adjustable relative to a stationary part of the longitudinal beam to tighten the crawler track, and
   wherein a length of the crawler track is unchanged by the at least one additional drive.

2. The crawler according to claim 1, wherein the at least one additional drive is detachably mounted on the longitudinal beam.

3. The crawler according to claim 1, wherein the at least one additional drive is mounted at one end of the longitudinal beam.

4. The crawler according to claim 3, wherein the at least one additional drive comprises two additional drives mounted at opposite ends of the longitudinal beam.

5. The crawler according to claim 1, wherein the at least one drive is adjustable relative to the longitudinal beam by a shifting mechanism.

6. A crawler comprising two parallel crawler assemblies, each crawler assembly comprising;
   a longitudinal beam having a first end and a second end;
   a crawler track which travels around the first end and the second end of the longitudinal beam, said crawler track having an upper run and a lower run;
   a drive unit at said first end of said longitudinal beam, said drive unit comprising a motor, a gearbox, and a drive sprocket which engages the crawler track;
   an additional drive unit mounted vertically above said longitudinal beam such that an axis of rotation of the additional drive is spaced apart from the longitudinal beam, said additional drive unit comprising a motor, a gearbox, and a drive sprocket which engages the upper run of said crawler track; and
   means for tensioning the crawler track at the second end of the longitudinal beam.

7. The crawler of claim 6, wherein the additional drive unit is adaptably mounted on the longitudinal beam.

8. The crawler of claim 6, wherein the additional drive unit is mounted at the first end of the longitudinal beam.

9. A crawler in which two crawler assemblies are arranged parallel to each other, each of the crawler assemblies comprising:
   a longitudinal beam having a longitudinal direction;
   a crawler track, which travels around the longitudinal beam in the longitudinal direction of the longitudinal beam and has an upper run and a lower run;
   at least one drive comprising a motor, a gearbox, and a drive sprocket, the drive sprocket meshing with the crawler track;
   an idler wheel having an adjustable position relative to a stationary part of the longitudinal beam to tighten the crawler track; and
   at least one first additional drive permanently mounted vertically above the longitudinal beam such that an axis of rotation of the additional drive is spaced apart from the longitudinal beam and acting on the upper run,
   wherein the crawler assembly has a length that is essentially unchanged by the at least one first additional drive.

10. The crawler according to claim 9, further comprising at least one second additional drive detachably mounted on the longitudinal beam.

11. The crawler according to claim 10, wherein at least one of the at least one first additional drive and the at least one second additional drive is mounted at one end of the longitudinal beam.

12. The crawler according to claim 10, wherein the at least one first additional drive and the at least one second additional drive are mounted at opposite ends of the longitudinal beam.

13. The crawler according to claim 10, wherein at least one of the at least one first additional drive and the at least one second additional drive is mounted at a position along the upper run.

14. The crawler according to claim 9, wherein the at least one drive is adjustable relative to the longitudinal beam by a shifting mechanism.

15. A crawler in which two crawler assemblies are arranged parallel to each other, each of the crawler assemblies comprising:
   a longitudinal beam having a longitudinal direction and extending between opposite free ends;
   a crawler track, which travels around the longitudinal beam in its longitudinal direction and which has an upper run and a lower run between opposite end runs;
   at least one drive comprising a motor, a gearbox, and a drive sprocket, which meshes with the crawler track;
   an idler wheel positioned to be adjustable relative to a stationary part of the longitudinal beam for tightening the crawler track; and
   at least one additional drive mounted vertically above the longitudinal beam such that an axis of rotation of the additional drive is spaced apart from the longitudinal beam at a selectable position between the opposite free ends and acting on the upper run;
   wherein a length of the crawler track is unchanged by the at least one additional drive.

16. The crawler according to claim 15, wherein the at least one additional drive is detachably mounted on the longitudinal beam.

17. The crawler according to claim 15, wherein the at least one additional drive is mounted at one end of the longitudinal beam.

18. The crawler according to claim 16, wherein the at least one additional drive comprises two additional drives mounted at opposite ends of the longitudinal beam.

19. The crawler according to claim 15, wherein the at least one drive is adjustable relative to the longitudinal beam by a shifting mechanism.

20. A crawler comprising two parallel crawler assemblies, each of the crawler assemblies comprising:
   a longitudinal beam having a first end and a second end;
   a crawler track which travels around the first end and the second end of the longitudinal beam, said crawler track having an upper run and a lower run;
   a drive unit at said first end of said longitudinal beam, said drive unit comprising a motor, a gearbox, and a drive sprocket which engages the track;
   a first additional drive unit permanently mounted vertically above said longitudinal beam such that an axis of rotation of the additional drive is spaced apart from the longitudinal beam, said additional drive unit comprising a motor, a gearbox, and a drive sprocket which engages the upper run of said crawler track;
   means for tensioning the crawler track at the second end of the longitudinal beam; and
   wherein the first additional drive unit is mounted at the first end of the longitudinal beam.

21. The crawler according to claim 20, further comprising a second additional drive unit adaptably mounted on the longitudinal beam.

22. The crawler according to claim 20, wherein the means for tensioning the crawler track is a shiftable drive unit comprising a drive sprocket engaging the crawler track.

23. A crawler in which two crawler assemblies are arranged parallel to each other, each of the crawler assemblies comprising:
   a longitudinal beam having a longitudinal direction;
   a crawler track, which travels around the beam in said longitudinal direction of the beam and which has an upper run and a lower run;
   at least one drive, comprising a motor, a gearbox, and a drive sprocket, which meshes with the crawler track;
   an idler wheel adjustable relative to a stationary part of the longitudinal beam to tighten the crawler track; and
   at least one additional drive comprising a motor, a gearbox, and a drive sprocket, which meshes with the crawler track, wherein said at least one additional drive acts on the upper run, is disposed vertically above the longitudinal beam such that an axis of rotation of the additional drive is spaced apart from the longitudinal beam, and is adjustable relative to a stationary part of the longitudinal beam to tighten the crawler track, and
   wherein a length of the crawler track is unchanged by the at least one additional drive.

24. A crawler in which two crawler assemblies are arranged parallel to each other, each of the crawler assemblies comprising:
   a longitudinal beam having a longitudinal direction;
   a crawler track, which travels around the beam in said longitudinal direction of the beam and which has an upper run and a lower run;
   at least one drive, comprising a motor, a gearbox, and a drive sprocket, which meshes with the crawler track;
   an idler wheel; and
   at least one additional drive, which acts on the upper run and is disposed between said longitudinal beam and said upper run of said crawler track, and adjustable relative to a stationary part of the longitudinal beam to tighten the crawler track, and
   wherein a length of the crawler track is unchanged by the at least one additional drive.

25. A crawler in which two crawler assemblies are arranged parallel to each other, each of the crawler assemblies comprising:
   a longitudinal beam having a longitudinal direction;
   a crawler track, which travels around the beam in said longitudinal direction of the beam and which has an upper run and a lower run;
   a first drive, comprising a motor, a gear box and a drive sprocket, which meshes with the crawler track, wherein the first drive is connected to the longitudinal beam at a first end concerning the longitudinal direction;
   a second drive comprising a motor, a gear box and a drive sprocket, which meshes with the crawler track, wherein the second drive is connected to the longitudinal beam at a second end with respect to the longitudinal direction, wherein the second end is opposite to the first end of the longitudinal beam;
   at least one additional drive, which acts on the upper run disposed vertically above the longitudinal beam and arranged neighboring the first drive at the first end of the longitudinal beam.

* * * * *